(12) United States Patent
Hiramatsu (10) Patent No.: US 6,842,482 B1
(45) Date of Patent: Jan. 11, 2005

(54) TRANSMISSION/RECEPTION APPARATUS (75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,251

(22) PCT Filed: Mar. 2, 2000

(86) PCT No.: PCT/JP00/01254
§ 371 (c)(1),
(2), (4) Date: Oct. 30, 2000

(87) PCT Pub. No.: WO00/54436
PCT Pub. Date: Sep. 14, 2000

(30) Foreign Application Priority Data

Mar. 6, 1999 (JP) ............................................ 11-103046

(51) Int. Cl.[7] .............................................. H04B 1/38
(52) U.S. Cl. ..................................................... 375/219
(58) Field of Search ................................. 370/337, 241, 370/252; 455/510, 410, 53.1, 456; 375/354, 357, 219, 220; 714/748, 749

(56) References Cited

U.S. PATENT DOCUMENTS

| 5,276,911 A | * | 1/1994 | Levine et al. ................ 455/510 |
| 5,598,404 A | | 1/1997 | Hayashi et al. |
| 5,615,215 A | * | 3/1997 | Utting et al. ................ 370/337 |
| 5,640,396 A | * | 6/1997 | Cudak et al. ................ 370/337 |
| 5,710,758 A | * | 1/1998 | Soliman et al. ............. 370/241 |
| 6,138,003 A | * | 10/2000 | Kingdon et al. ............ 455/410 |
| 6,282,427 B1 | * | 8/2001 | Larsson et al. .......... 455/456.2 |

FOREIGN PATENT DOCUMENTS

| EP | 0865172 | 9/1998 |
| JP | 7283779 | 10/1995 |

* cited by examiner

Primary Examiner—Don N. Vo
(74) Attorney, Agent, or Firm—Stevens, Davis, Miller & Mosher, LLP (57) ABSTRACT Decision section 110 extracts retransmission requests from the reception signal after a CRC check, which is the output of CRC check section 107, counts, decides whether the number of times the retransmission requests are consecutively received has reached an arbitrary threshold or not, and in the case where the number of times has reached the arbitrary threshold, decision section 110 instructs timing control section 111 to change the transmission timing and timing control section 111 advances the transmission timing according to the instruction of decision section 110 and sets a new transmission timing in modulation section 108 and transmission RF section 109.

6 Claims, 5 Drawing Sheets

TRANSMISSION/RECEPTION APPARATUS

TECHNICAL FIELD

The present invention relates to a transmission/reception apparatus and its transmission timing control method used for a mobile communication based on a system, which performs transmission/reception by assigning time varying from one user to another such as a TDMA system or CDMA/TDD system in particular.

BACKGROUND ART

A TDMA-based or CDMA/TDD-based mobile communication specifies a slot, which is an arbitrary unit time, assigns a user to each slot and switches between transmission and reception for every frame, which consists of a plurality of slots.

Figure 1:
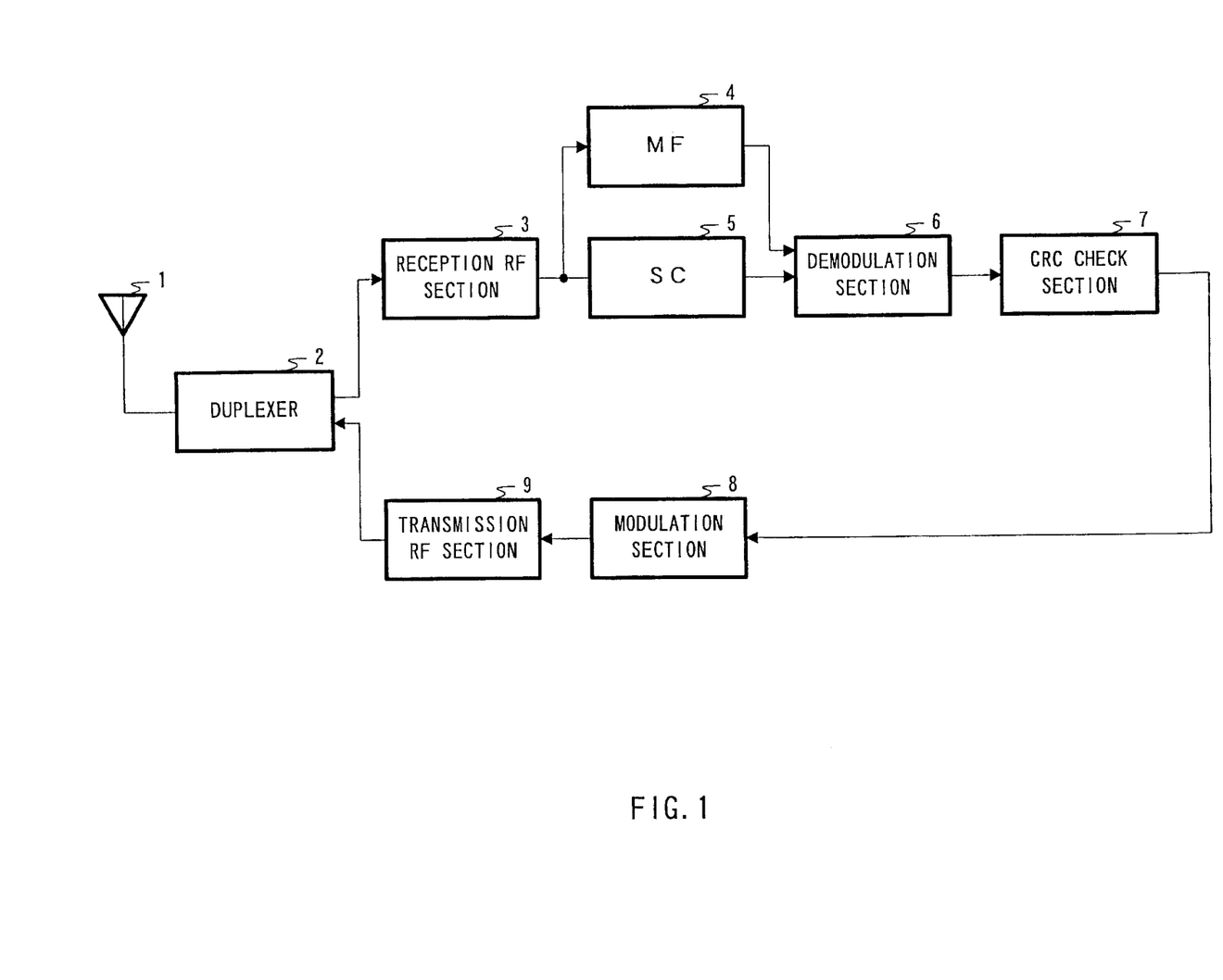
FIG. 1 is a main block diagram showing an outlined configuration of a conventional transmission/reception apparatus.

A conventional transmission/reception apparatus provided on a base station apparatus and communication terminal apparatus will be explained below using FIG. 1. FIG. 1 is a main block diagram showing an outlined configuration of a conventional transmission/reception apparatus.

Here, the present application relates to transmission timing control and its processing is mainly performed by a control signal, and therefore detailed explanations of user data and its processing system will be omitted in the following explanations and drawings.

In the transmission/reception apparatus shown in FIG. 1, antenna 1 transmits/receives a radio signal, duplexer 2 switches between input and output of a transmission/reception signal to/from antenna 1 and reception RF section 3 performs reception processing on a reception signal.

Matched filter (hereinafter referred to as "MF") 4 calculates a correlation value in a known symbol interval of the reception signal using a preset known symbol, detects a channel estimated value of the reception signal and outputs the channel estimated value to demodulation section 6, which will be described later. Sliding correlator (hereinafter referred to as "SC") 5 performs despreading processing on the reception signal using an intrinsic code.

Demodulation section 6 performs a complex multiplication on the channel estimated value for each despread reception signal, compensates phase rotation and amplitude variation and demodulates. CRC check section 7 decides whether demodulation is performed on the demodulated reception signal correctly or not.

Modulation section 8 performs modulation on the decision result, which is the output of CRC check section 7, that is, the decision result as to whether reception has been performed correctly or not, and transmission RF section 9 performs transmission processing on the decision result subjected to modulation processing and transmits the decision result from antenna 1 via duplexer 2.

This transmitted decision result is, in other words, a retransmission request and the other end of communication which receives this signal continues transmission if the decision result of the reception condition shows that reception has been acceptable with no error and retransmits a transmission signal if the decision result shows that reception includes some errors and has not been performed correctly.

As shown above, based on the decision result after demodulation processing, the conventional transmission/reception apparatus sends a retransmission request to the other end of communication in the case where reception has not been performed correctly.

Figure 2:
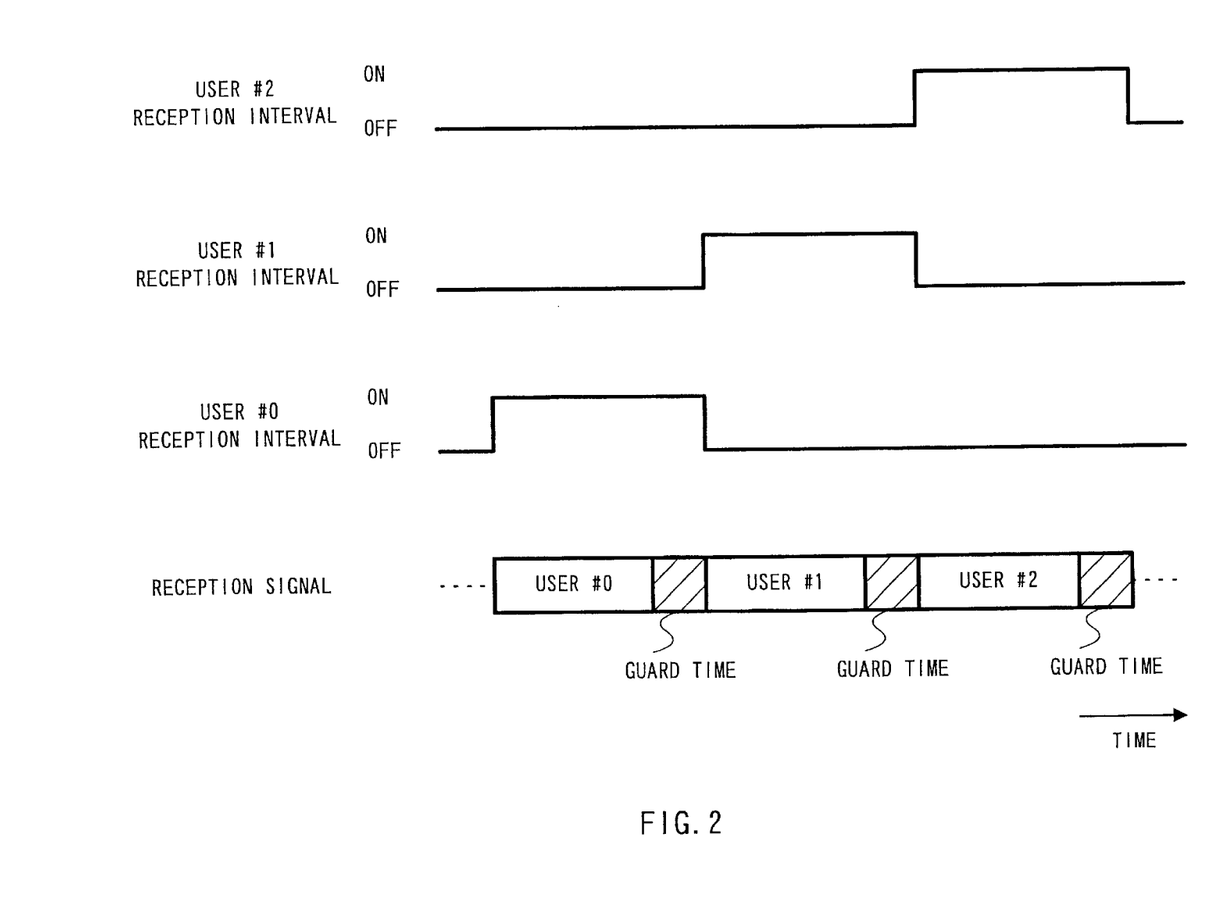
FIG. 2 is a schematic diagram showing slot reception in the conventional transmission/reception apparatus.

Next, the method of extracting data of each user assigned to each slot based on a TDMA or CDMA/TDD system will be explained using FIG. 2. FIG. 2 is a schematic diagram showing how slot reception is performed in the conventional transmission/reception apparatus.

In the case where the conventional transmission/reception apparatus is used for a communication terminal apparatus, each data piece is extracted as shown in FIG. 2, by the reception system operating only in a desired data interval and turning off in data intervals for other users.

Moreover, in the case where the conventional transmission/reception apparatus is used for a base station apparatus carrying out a radio communication with a plurality of communication terminal apparatuses, the transmission/reception apparatus receives a radio signal from each user by changing the reception interval for every user.

Here, each slot is normally provided with guard times containing no data so that reception is possible within the reception interval even if a delay is produced in the reception signal.

That is, a reception interval has a length adding up the user data length and the guard time length and the guard time serves as a margin interval in the case where a delay is produced in the reception signal.

Therefore, even if a propagation delay is produced in the reception signal, the entire slot can fit in the reception interval as long as the delay time is within the guard time length, and therefore the entire slot is received correctly.

However, in the case where a delay exceeding the guard time length is produced, the conventional transmission/reception apparatus has a problem of being unable to receive data after the reception interval. A more detailed explanation will be given below with reference to FIG. 3. FIG. 3 is a schematic diagram showing slot reception in the conventional transmission/reception apparatus.

Figure 3A:
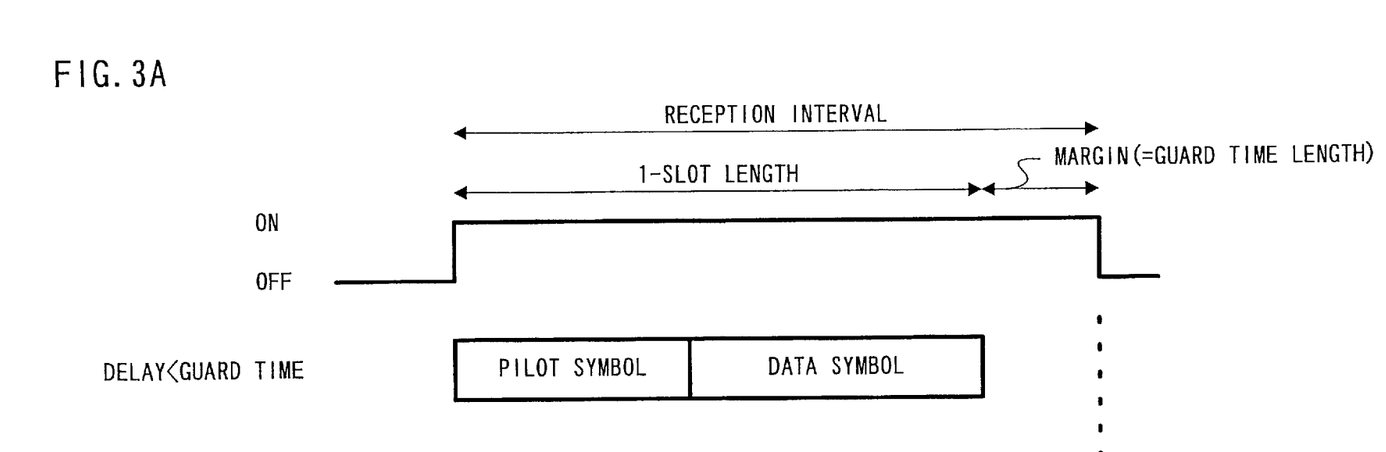
FIG. 3A is a schematic diagram showing slot reception in the conventional transmission/reception apparatus when a delay time is shorter than a guard time length.

FIG. 3A shows a case where the delay time is shorter than the guard time length and, as shown in the figure, the one entire slot fits in the reception interval and all data is received.

Figure 3B:
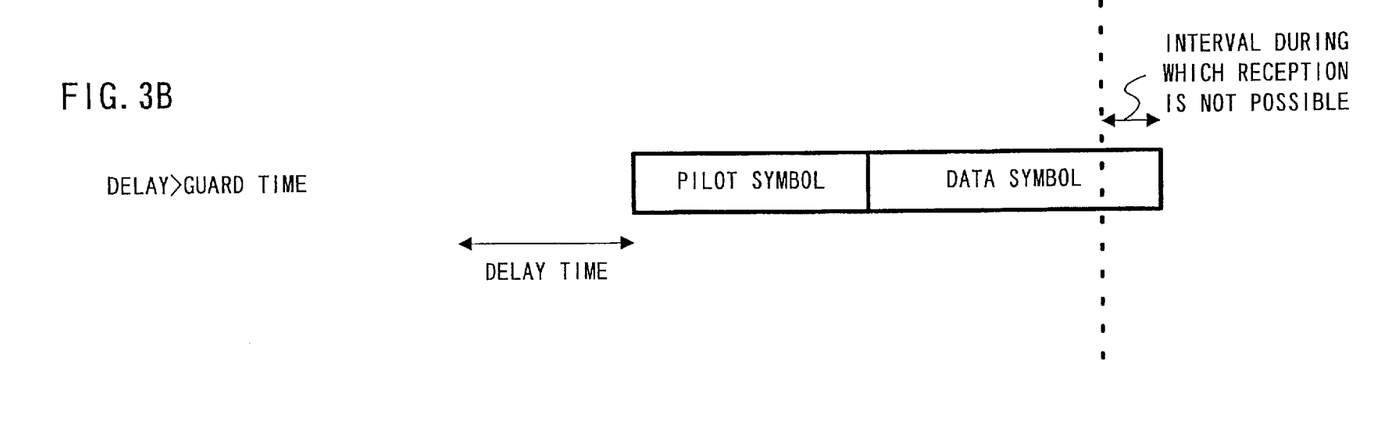
FIG. 3B is a schematic diagram showing slot reception in the conventional transmission/reception apparatus when a delay time is longer than a guard time length.

On the other hand, FIG. 3B shows a case where the delay time is longer than the guard time length and the rear end of the data symbol does not fin in the reception interval, preventing the area beyond the reception interval from being received.

When a CRC check detects that reception has not been performed correctly, as already explained using FIG. 3, a retransmission request is sent to the other end of communication, which is the transmission source.

However, in the case where this delay is considered attributable to a long distance between the communication stations, this propagation delay is considered to continue almost constantly, repeating retransmission requests; hence the problem of being unable to continue communications indefinitely.

DISCLOSURE OF INVENTION

It is an objective of the present invention to provide a transmission/reception apparatus that will suppress propagation delays exceeding a guard time length.

A main subject of the present invention is for a transmission/reception apparatus to monitor the number of retransmission requests sent from the other end of communication and advance the transmission timing of a transmission signal in the case where propagation delays exceeding the guard time length are considered to continue.

BEST MODE FOR CARRYING OUT THE INVENTION

With reference now to the attached drawings, embodiments of the present invention will be explained in detail below.

Here, the present application relates to transmission timing control and its processing is mainly performed by a control signal, and therefore detailed explanations of user data and its processing system will be omitted in the following explanations and drawings.

Embodiment 1

The transmission/reception apparatus according to this embodiment changes the transmission timing based on the number of retransmission requests consecutively received from the other end of communication.

When a delay time at the other end of communication exceeds a guard time length and retransmission requests are repeatedly sent back, if such a delay occurs accidentally, those retransmission requests will not be sent back consecutively, but if the delay is attributable to a long distance between the communication stations, the propagation delay is considered to continue almost constantly and those retransmission requests are estimated to be sent back consecutively unless the distanced between the communication stations is changed.

Thus, in the case where the number of retransmission requests consecutively received exceeds a threshold, this embodiment decides that a delay time is exceeding the guard time length consecutively and advances the transmission timing.

Figure 4:
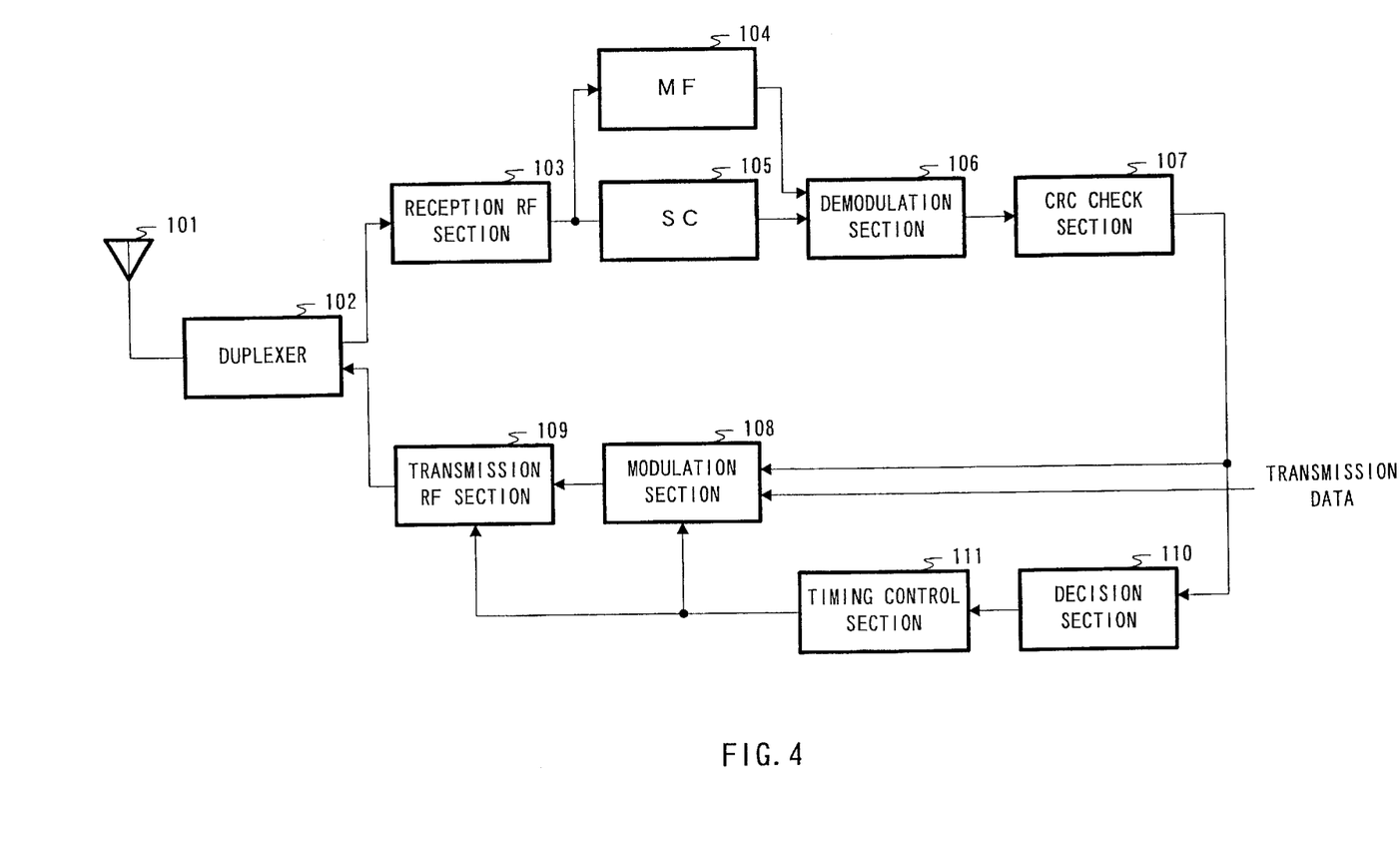
FIG. 4 is a main block diagram showing an outlined configuration of a transmission/reception apparatus according to Embodiment 1 of the present invention.

The transmission/reception apparatus according to this embodiment will be explained below using FIG. 4. FIG. 4 is a main block diagram showing an outlined configuration of the transmission/reception apparatus according to Embodiment 1 of the present invention.

In FIG. 4, antenna 101 transmits/receives a radio signal, duplexer 102 switches between input and output of a transmission/reception signal to/from antenna 101 and reception RF section 103 performs reception processing on the reception signal.

MF 104 calculates a correlation value for a known symbol interval of the reception signal using a preset known symbol, detects a channel estimated value of the reception signal and outputs the channel estimated value to demodulation section 306, which will be described later. SC 105 performs despreading processing on the reception signal using an intrinsic code.

Demodulation section 106 performs a complex multiplication by the channel estimated value, which is the output of MF 104, on the despread reception signal, compensates phase rotation and amplitude variation and demodulates.

CRC check section 107 decides whether demodulation is performed on the demodulated reception signal correctly or not.

Modulation section 108 performs modulation processing on the transmission signal and the decision result, which is the output of CRC check section 107, that is, the decision result as to whether reception has been performed correctly or not. Transmission RF section 109 performs transmission processing on the transmission signal subjected to modulation processing and transmits the transmission signal from antenna 101 via duplexer 102.

This decision result transmitted is, in other words, a retransmission request and the other end of communication which receives this signal continues transmission if the decision result of the reception condition shows that reception has been performed correctly with no error and retransmits a transmission signal if the decision result shows that reception includes some errors and has not been performed correctly.

Decision section 110 extracts a retransmission request, that is, the decision result that the other end of communication has not received a communication correctly, from the reception signal after the CRC check, which is the output of CRC check section 107, counts it and decides whether the number of retransmission requests consecutively received reaches an arbitrary threshold or not.

When the number of retransmission requests consecutively received reaches the arbitrary threshold, decision section 110 decides that the own station is far from the other end of communication; a propagation delay at the ether end of communication exceeds the guard time length; the propagation delay will not be changed even if transmission continues further; and communications will be disabled with retransmission requests simply being repeated, and instructs timing control section 111, which will be described later, to change the transmission timing.

Timing control section 111 advances the transmission timing based on the instruction of decision section 110 and sets a new transmission timing in modulation section 108 and transmission RF section 109. That is, when decision section 110 decides that the propagation delay when a transmission signal from the own station arrives at the other end of communication exceeds the guard time length, decision section 110 advances the timing at which the transmission signal from the own station is sent. The width of the advancing step can be arbitrarily decided.

Next, the operation of the transmission/reception apparatus with the above configuration will be explained.

First, a radio signal from the other end of communication is received by antenna 101, passed through duplexer 102 and subjected to reception processing by reception RF section 103.

MF 104 calculates a correlation value of a signal of a known symbol interval of the reception signal, detects a channel estimated value of the reception signal and outputs the channel estimated value to demodulation section 106. SC 105 performs despreading processing on the reception signal.

Demodulation section 106 compensates phase rotation and amplitude variation for the despread reception signal using a channel estimated value and performs demodulation processing. The reception signal subjected to demodulation processing is decided by CRC check section 107 if reception has been performed correctly or not.

The reception signal after the CRC check is input to decision section 110. Decision section 110 extracts and counts retransmission requests in the reception signal. When the number of retransmission requests consecutively received reaches an arbitrary threshold, this information is transmitted by decision section 110 to timing control section 111 and timing control section 111 advances the transmission timing at modulation section 108 and transmission RF section 109.

As shown above, in the case where the reception condition at the other end of communication is not good, this embodiment can suppress a propagation delay to advance the transmission timing and improve the reception condition at the other end of communication. That is, this embodiment detects a situation in which the delay time consecutively exceeds the guard time length based on the number of retransmission requests consecutively received from the other end of communication, suppresses the propagation delay to advance the transmission timing and thus can improve the reception condition at the other end of communication.

Here, instead of considering a case where the number of retransmission requests consecutively received has exceeded a threshold as the condition for detecting a situation in which the delay time consecutively exceeds the guard time length, it is also possible to consider a case where the number of retransmission requests consecutively received within an arbitrary time exceeds a threshold.

Furthermore, when the decision result is sent back to the other end of communication, it is also possible to send data if the reception condition is acceptable and send no data if the reception condition is not acceptable and let decision section 110 of the transmission/reception section according to this embodiment count the number of times there is no data sent back as the decision result.

Embodiment 2

The transmission/reception apparatus according to this embodiment has the same configuration as that of Embodiment 1 except that the transmission timing is changed based on the number of retransmission requests consecutively received from the other end of communication and an estimated distance from the other end of communication.

In the case where a delay at the other end of communication is considered attributable to a long distance between the communication stations, the propagation delay is considered to continue almost constantly, but in the case where retransmission requests are just repeated accidentally for other reasons, advancing the transmission timing may contrarily deteriorate the reception condition at the other end of communication.

Therefore, this embodiment monitors not only the number of retransmission requests consecutively received but also an estimated distance from the other end of communication and advances the transmission timing when the number of retransmission requests consecutively received reaches a threshold and at the same time the estimated distance exceeds a threshold.

Suppose the transmission/reception apparatus according to this embodiment is used by a communication terminal apparatus, which is performing a radio communication with a base station apparatus.

Propagation loss L [dB] at the communication terminal of a transmission signal from the base station can be generally expressed for a cell with a radius of 1 km or more as follows:

$$L = 38 \cdot \log 10 d - 18 \cdot \log 10 h + 21 \cdot \log 10 f + 80$$

where, d denotes a distance (km) between the communication stations; f, carrier frequency (MHz); and h, height of the base station antenna (m).

Thus, if the carrier frequency and the height of the base station antenna are known, distance d can be estimated from transmit power (including antenna gain) at the base station and reception power (subtracting antenna gain) at the communication terminal.

Since an estimated distance between the communication stations can be easily calculated from information easily available at the reception system in this way, it is possible to advance the transmission timing only when the estimated distance between the communication stations exceeds a threshold and improve the accuracy of detecting the situation in which the delay time consecutively exceeds the guard time length.

Figure 5:
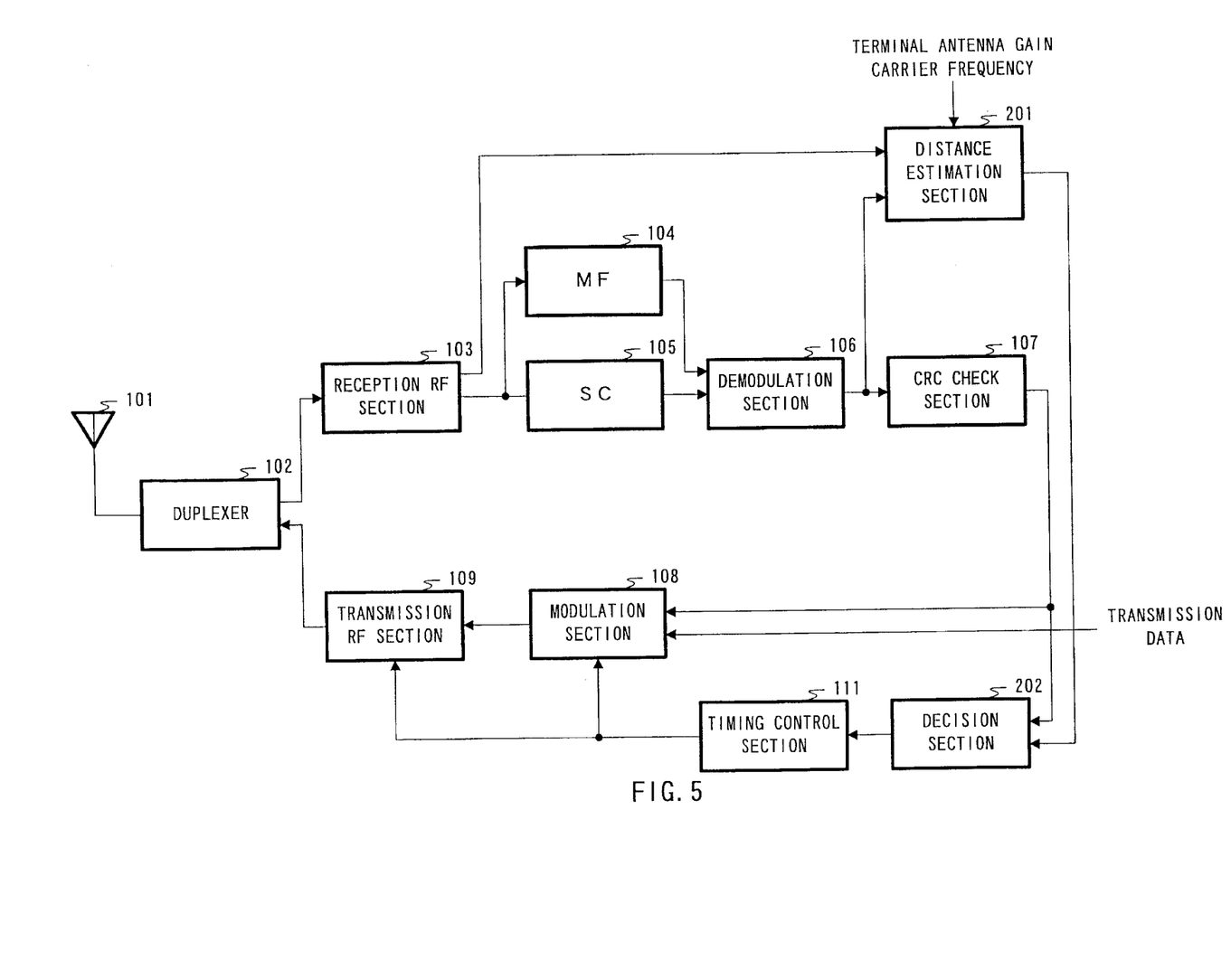
FIG. 5 is a main block diagram showing an outlined configuration of a transmission/reception apparatus according to Embodiment 2 of the present invention.

The transmission/reception apparatus according to this embodiment will be explained below using FIG. 5. FIG. 5 is a main block diagram showing an outlined configuration of the transmission/reception apparatus according to Embodiment 2 of the present invention. The parts with the same configuration as that in Embodiment 1 will be assigned the same reference numerals and their detailed explanations will be omitted.

In FIG. 5, distance estimation section 201 receives the reception level from reception RF section 103 and the transmission level of the base station apparatus, which is the other end of communication, obtained from a control signal in a demodulated reception signal and also receives a known terminal antenna gain and carrier frequency, and calculates an estimated distance between the communication stations from these values based on the aforementioned expression.

Decision section 202 extracts a retransmission request from the reception signal after the CRC check, which is the output of CRC check section 107, counts it and decides whether the number of retransmission requests consecutively received reaches an arbitrary threshold or not.

Decision section 202 decides whether the calculated estimated distance between the communication stations, which is the output of distance estimation section 201, exceeds an arbitrary threshold or not.

In the case where the number of retransmission requests consecutively received reaches the arbitrary threshold and at the same time the estimated distance between the communication stations exceeds the arbitrary threshold, decision section 110 instructs timing control section 111 to change the transmission timing.

Since this embodiment advances the transmission timing only when the estimated distance between the communication stations exceeds a threshold, it is possible to improve the accuracy of detecting a situation in which a delay time consecutively exceeds the guard time length.

Here, instead of considering a case where the number of retransmission requests consecutively received reaches a threshold as one of the conditions for detecting a situation in which the delay time consecutively exceeds the guard time length, it is also possible to consider a case where the number of retransmission requests consecutively received within an arbitrary time exceeds a threshold.

When the decision result is sent back to the other end of communication, it is also possible to send data if the reception condition is acceptable, send no data if the reception condition is not acceptable and for decision section 202 of the transmission/reception apparatus according to this embodiment to count the number of times there is no data sent back as the decision result.

As described in Embodiment 1 and Embodiment 2 above, the transmission/reception apparatus of the present invention can be applied to a communication terminal apparatus in a mobile communication and allows the communication terminal apparatus to autonomously detect that it is too far from the base station apparatus for the communication terminal apparatus to communicate, advance the transmission timing and improve the reception condition at the base station apparatus, which is the other end of communication.

The present invention can be applied to a communication terminal apparatus or base station apparatus in a digital radio communication system. When it is decided that propagation delays exceeding a guard time length are produced consecutively due to a long distance between the communication apparatuses, the present invention can suppress the propagation delays exceeding the guard time length and improve the reception condition at the other end of communication.

As explained above, when a situation in which delay times upon arrival at the other end of communication consecutively exceed a guard time length is detected, the present invention advances the transmission timing at the own station and thus can suppress propagation delays exceeding the guard time length.

This application is based on the Japanese Patent Application No.HEI 11-103046 filed on Mar. 6, 1999, entire content of which is expressly incorporated by reference herein.

Industrial Applicability

The present invention can be applied to a communication terminal apparatus or base station apparatus in a digital radio communication system.

What is claimed is:

1. A transmission/reception apparatus comprising:
   a receiver that receives a retransmission request sent from an other end of communication;
   a decider that makes a decision as to whether or not a number of times the retransmission request has been received has reached a predetermined threshold; and
   a controller that advances a timing of a signal transmission when the decision is made that the number of times the retransmission request has been received has reached the predetermined threshold.

2. The transmission/reception apparatus according to claim 1,
   wherein said decider makes said decision according to whether or not said number of times the retransmission request has been received consecutively has reached said predetermined threshold; and
   wherein said controller advances said timing of said signal transmission when said decision is made that the number of times the retransmission request has been received consecutively has reached the predetermined threshold.

3. The transmission/reception apparatus according to claim 1,
   wherein said decider makes said decision according to whether or not said number of times the retransmission request has been received in a predetermined period of time has reached said predetermined threshold; and
   wherein said controller advances said timing of said signal transmission when said decision is made that the number of times the retransmission request has been received said predetermined period of time has reached the predetermined threshold.

4. The transmission/reception apparatus according to claim 1, further comprising a distance estimator that estimates a distance between said transmission/reception apparatus and the other end of communication,
   wherein said controller advances said timing of said signal transmission only when said decision is made that the number of times the retransmission request has been received has reached the predetermined threshold and said distance estimator estimates that the estimated distance exceeds another predetermined threshold.

5. The transmission/reception apparatus according to claim 4, wherein the distance estimator comprises a predetermined arithmetic expression that relates a propagation loss to the distance between said transmission/reception apparatus and the other end of communication, a height of an antenna at the other end of communication and a carrier frequency, and estimates said distance between said transmission/reception apparatus and the other end of communication by applying the propagation loss, obtained by subtracting a received power at said transmission/reception apparatus from a transmitted power at the other end of communication, to the arithmetic expression.

6. A transmission timing control method comprising:
   receiving a retransmission request sent from an other end of communication;
   making a decision as to whether or not a number of times the retransmission request has been received has reached a predetermined threshold; and
   advancing a timing of a signal transmission when the decision is made that the number of times the retransmission request has been received has reached the predetermined threshold.

* * * * *

UNITED STATES PATENT AND TRADEMARK OFFICE
CERTIFICATE OF CORRECTION

PATENT NO. : 6,842,482 B1
DATED : January 11, 2005
INVENTOR(S) : Hiramatsu

It is certified that error appears in the above-identified patent and that said Letters Patent is hereby corrected as shown below:

<u>Title page,</u>
Item [22], PCT Filing Date, should be -- March 3, 2000 -- not "March 2, 2000".

Signed and Sealed this

Thirtieth Day of August, 2005

JON W. DUDAS
*Director of the United States Patent and Trademark Office*